United States Patent
Dahl et al.

(10) Patent No.: US 11,773,793 B2
(45) Date of Patent: Oct. 3, 2023

(54) METHOD AND SYSTEM FOR COMPRESSED AIR SUPPLY

(71) Applicant: Ford Global Technologies, LLC, Dearborn, MI (US)

(72) Inventors: Colby Dahl, Saline, MI (US); Douglas Martin, Canton, MI (US); Matthew Ryan Preston, Whitmore Lake, MI (US); John Rollinger, Troy, MI (US); Shriram Siravara, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/650,042

(22) Filed: Feb. 4, 2022

(65) Prior Publication Data

US 2023/0250768 A1 Aug. 10, 2023

(51) Int. Cl.
*F02D 29/04* (2006.01)
*F15B 1/04* (2006.01)
(Continued)

(52) U.S. Cl.
CPC .............. *F02D 29/04* (2013.01); *F02B 63/06* (2013.01); *F02D 41/0082* (2013.01);
(Continued)

(58) Field of Classification Search
CPC .. F02D 29/04; F02D 41/0082; F02D 41/0087; F02D 41/38; F02D 41/0007; F02D 23/00; F02D 13/06; F02D 17/023; F02D 17/02; F02D 41/008; F02D 41/0085; F02B 63/06; F02B 37/00; F02B 37/013;
(Continued)

(56) References Cited

U.S. PATENT DOCUMENTS 2,849,173 A * 8/1958 Surdy ................ F02B 37/04
417/246
3,204,859 A * 9/1965 Crooks .............. F02B 37/164
417/364
(Continued)

FOREIGN PATENT DOCUMENTS

DE 102012016247 A1 3/2013
DE 102013019364 A1 7/2014
(Continued)

OTHER PUBLICATIONS

"Mattei Classic Series Catalog," Mettei Group Website, Available Online at https://www.matteigroup.com/products/lubricated-compressors/classic-series, Available as Early as Sep. 24, 2020, 16 pages.
(Continued)

*Primary Examiner* — Sizo B Vilakazi
*Assistant Examiner* — Brian R Kirby
(74) *Attorney, Agent, or Firm* — Vincent Mastrogiacomo; McCoy Russell LLP

(57) ABSTRACT

Methods and systems to provide compressed air to one or more air consumers external to the engine via exhaust gases of an internal combustion engine are presented. In one example, the exhaust gas may be routed to drive an air turbine of an air compression system. The air compressed at the compression system may be stored in a tank and/or provided to the one or more air consumers.

20 Claims, 5 Drawing Sheets

(51) Int. Cl.
*F02D 41/00* (2006.01)
*F02D 41/38* (2006.01)
*F02B 63/06* (2006.01)

(52) U.S. Cl.
CPC ......... *F02D 41/0087* (2013.01); *F02D 41/38* (2013.01); *F15B 1/04* (2013.01)

(58) Field of Classification Search
CPC .......... F02B 37/04; F02B 33/44; F02B 21/00; F02B 37/16; F15B 1/04
USPC ................. 123/198 F; 60/597, 614; 417/380
See application file for complete search history.

(56) References Cited

U.S. PATENT DOCUMENTS

| | | | | |
|---|---|---|---|---|
| 3,365,014 A * | 1/1968 | Clingerman | ............ | F02B 33/00 123/198 C |
| 3,963,379 A * | 6/1976 | Ueno | ........................ | B60T 1/14 417/237 |
| 4,169,354 A * | 10/1979 | Woollenweber | .......... | F01N 5/04 60/605.1 |
| 4,341,506 A * | 7/1982 | Klein | ...................... | F04B 41/02 418/83 |
| 4,429,532 A * | 2/1984 | Jakuba | .................... | F02D 13/06 60/605.1 |
| 4,496,291 A * | 1/1985 | Grimmer | ................ | F02B 37/007 417/247 |
| 4,638,634 A * | 1/1987 | McLean | ................. | F02B 37/164 60/602 |
| 4,652,216 A * | 3/1987 | Eslinger | ................... | B60T 17/02 417/252 |
| 5,341,644 A * | 8/1994 | Nelson | .................... | F02B 63/00 417/364 |
| 5,385,449 A * | 1/1995 | Wenzel | .................... | F04D 25/16 417/364 |
| 5,997,259 A * | 12/1999 | Marshall | .................. | F04B 41/04 417/364 |
| 6,655,142 B2 | 12/2003 | Callas | ...................... | F02B 39/04 60/624 |
| 6,726,457 B2 * | 4/2004 | Wenzel | .................... | F04B 25/00 417/244 |
| 6,829,892 B2 * | 12/2004 | Larson | .................... | F02B 29/00 60/626 |
| 6,922,997 B1 * | 8/2005 | Larson | ...................... | F02D 9/04 60/626 |
| 7,367,327 B2 * | 5/2008 | Piriou | ..................... | F02M 26/38 60/605.2 |
| 7,975,666 B2 * | 7/2011 | Gokhale | ............ | F02D 41/0002 123/531 |
| 8,495,877 B2 * | 7/2013 | Weyer | ................... | F02B 37/004 60/624 |
| 9,181,856 B2 * | 11/2015 | Grissom | ............... | F02B 37/013 |
| 9,422,856 B2 * | 8/2016 | Németh | ................... | F02B 33/44 |
| 9,688,260 B2 * | 6/2017 | Aixala | .................... | B60T 17/02 |
| 10,202,913 B2 | 2/2019 | Xiao et al. | | |
| 2005/0150210 A1 * | 7/2005 | Hergemoller | ............. | F01N 3/32 60/280 |
| 2006/0137345 A1 * | 6/2006 | Cho | ................. | F02M 35/10157 60/605.1 |
| 2008/0006031 A1 * | 1/2008 | Schick | .................... | F02B 37/00 60/605.1 |
| 2008/0256951 A1 * | 10/2008 | Delavan | .................. | F02D 23/00 60/624 |
| 2011/0081257 A1 * | 4/2011 | Kley | ........................ | F02B 21/00 417/364 |
| 2012/0210952 A1 | 8/2012 | Reuss et al. | | |
| 2014/0223901 A1 * | 8/2014 | Versteyhe | ............. | F04D 25/026 60/605.1 |
| 2017/0226942 A1 * | 8/2017 | Denner | ................... | F04D 25/16 |
| 2017/0260916 A1 * | 9/2017 | Kraemer | ................. | F02B 75/20 |
| 2021/0332744 A1 * | 10/2021 | Moine | ............. | F02M 35/10236 |
| 2021/0381451 A1 * | 12/2021 | Rollinger | ................ | F02B 21/00 |

FOREIGN PATENT DOCUMENTS

| | | | | |
|---|---|---|---|---|
| GB | 2321502 A | * | 7/1998 | ............. F01D 15/12 |
| GB | 2403772 A | | 1/2005 | |
| WO | WO-2006032402 A1 | * | 3/2006 | .......... F02B 29/0418 |
| WO | WO-2009106881 A1 | * | 9/2009 | ............. F01L 13/06 |

OTHER PUBLICATIONS

Martin, D. et al., "Methods and System for Stopping an Internal Combustion Engine," U.S. Appl. No. 17/180,569, filed Feb. 19, 2021, 34 pages.
Dahl, C. et al., "Method and System for an on Board Compressor," U.S. Appl. No. 17/645,255, filed Dec. 20, 2021, 28 pages.
Dahl, C. et al., "Method and System for Compressed Air Supply," U.S. Appl. No. 17/650,040, filed Feb. 4, 2022, 36 pages.
"Flow Control Valves," Parker Website, Available Online at https://ph.parker.com/us/en/flow-control-valves, Retrieved on May 4, 2022, 3 pages.
"V8 Vane Motor—5,4 KW/7.2 HP," Globe Benelux Website, Available Online at https://globe-benelux.nl/airmotors/en/products/v8-vane-air-motor-5-4-kw-7-2-hp, Retrieved on May 4, 2022, 5 pages.

* cited by examiner

METHOD AND SYSTEM FOR COMPRESSED AIR SUPPLY

FIELD

The present application relates to methods and systems for generating and supplying compressed air aboard a vehicle that includes an internal combustion engine.

BACKGROUND/SUMMARY

Compressed air may be a preferred form of energy for operation of certain external devices coupled to a vehicle. For example, in building trades, compressed air may be applied to operate nail guns, staplers, paint sprayers, chippers, and air hammers. The compressed air may be more suitable for operating tools in wet environments, hot environments, and environments where there may be large amounts of dust. Air operated tools may have advantages including being lighter, lower in cost, and having a greater power to weight ratio as compared to electrically operated tools. However, towing a compressor to a job site may be inconvenient, and some compressors may be electrically powered. Thus, an electric power source may have to be brought with the compressor to operate the compressor. Consequently, some of the advantages of air operated tools may be reduced depending on resources that may be available at a job site, and ancillary devices may have to be leveraged to operate the air powered tools. Compressed air may also be used to inflate vehicle tires to a desired pressure.

Attempts have been made to generate and supply compressed air to external devices. One example system and associated method is shown by Aixala et. al. in U.S. Pat. No. 9,688,260. Therein, engine torque is used to operate an air compressor and the compressed air is stored in a tank. The rate of compressed air generated may be adjusted based on engine operation.

However, the inventors herein have recognized potential issues with using engine torque to generate compressed air. As one example, by using a portion of the engine torque generated to drive an air compressor, the parasitic loss of engine power may be increased. During higher engine torque demand, supplying engine torque for compressed air generation may cause loss of desired engine power and deteriorate driving experience.

In one example, the issues described above may be addressed by a method for a vehicle, comprising supplying exhaust gas from an engine to drive an air turbine of an air compression system, and providing compressed air to one or more air consumers external to the engine. In this way, by selectively using engine exhaust to generate compressed air, availability of engine torque may not be affected.

As one example, the engine may include two cylinder banks (first and second), with each bank comprising one or more cylinders. The first cylinder bank may be coupled to an air compression system, including an air turbine, via a diverter valve. The air turbine may be connected to a compressor of the air compression system via a shaft housing a gear system. The compressor may be configured to supply compressed air to a tank or directly to an air powered tool. In response to a request for compressed air, such as during operation of an air powered tool with a pressure of compressed air in the tank being lower than a first threshold level, fuel injection and combustion in each cylinder in the first cylinder bank may be suspended. The diverter valve may be actuated to a first position to divert exhaust gas, which is mostly comprised of air, from the first cylinder bank to the air turbine. The gear system may be adjusted to adjust rotational speed of the compressor corresponding to the rotation of the air turbine. The compressor may draw in ambient air and compress the air, which may then be directed to the tank or directly supplied to the air powered tool. In response to the pressure of compressed air in the tank increasing to a second threshold level, the generation of the compressed air may be discontinued, and combustion may resume in all engine cylinders.

In this way, by applying energy from engine exhaust gases to generate compressed air, it may be possible to provide compressed air without towing a compressor or using an electric power source to drive a compressor. Further, the approach may be integrated into a vehicle to allow convenient operation of air powered devices. In addition, the approach may be applied to vehicles that include V or inline engines. The technical effect of using exhaust from non-combusting cylinders to drive the air turbine is that particles typically present in the exhaust gas due to byproducts of combustion may not significantly contaminate the turbine, thereby improving turbine operation and reducing wear. By only using exhaust gas to generate compressed air, engine torque output may not be affected. As such, utility of a vehicle may be enhanced and customer satisfaction may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
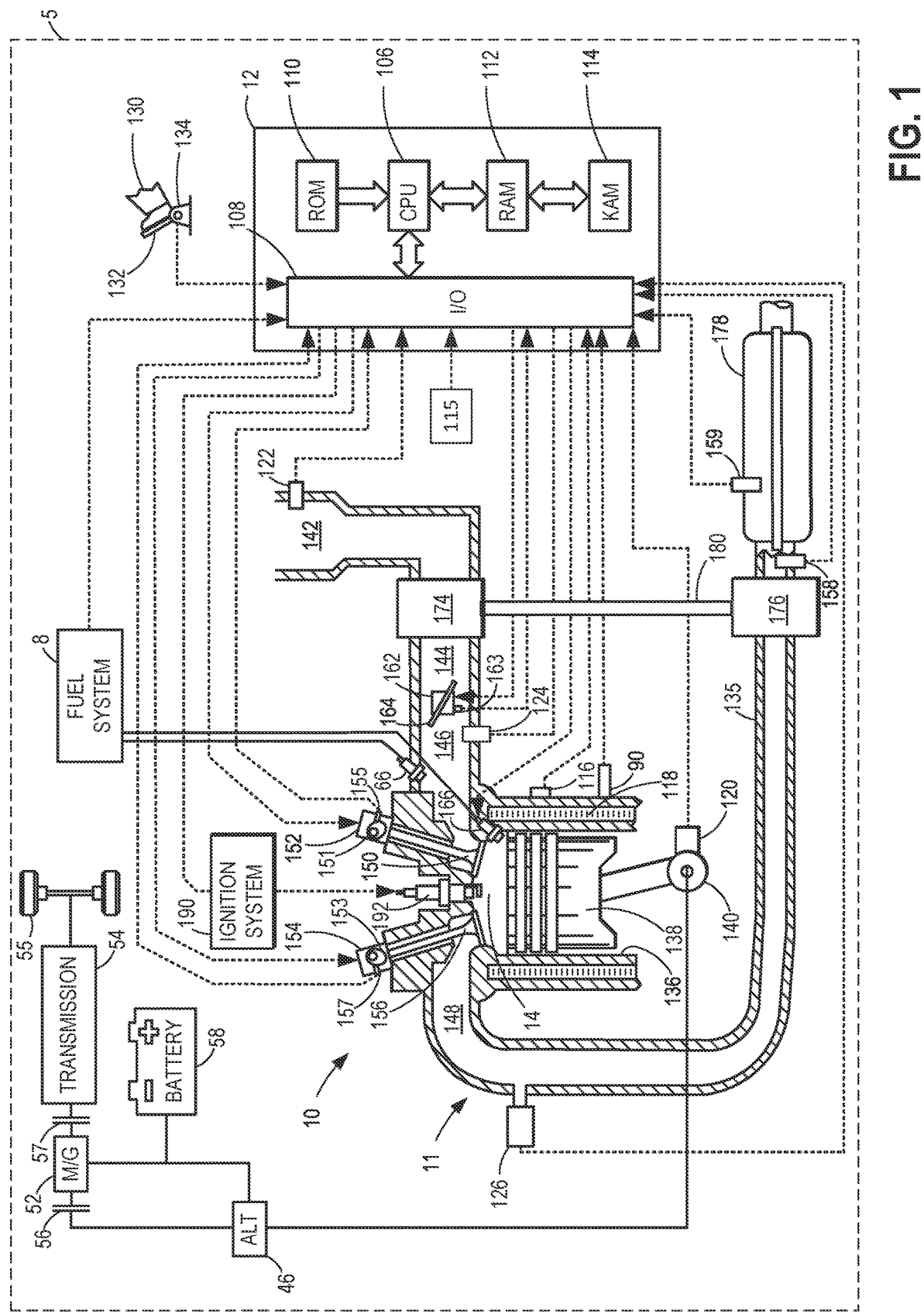
FIG. 1 shows a schematic depiction of an engine system of a vehicle.
Figure 2:
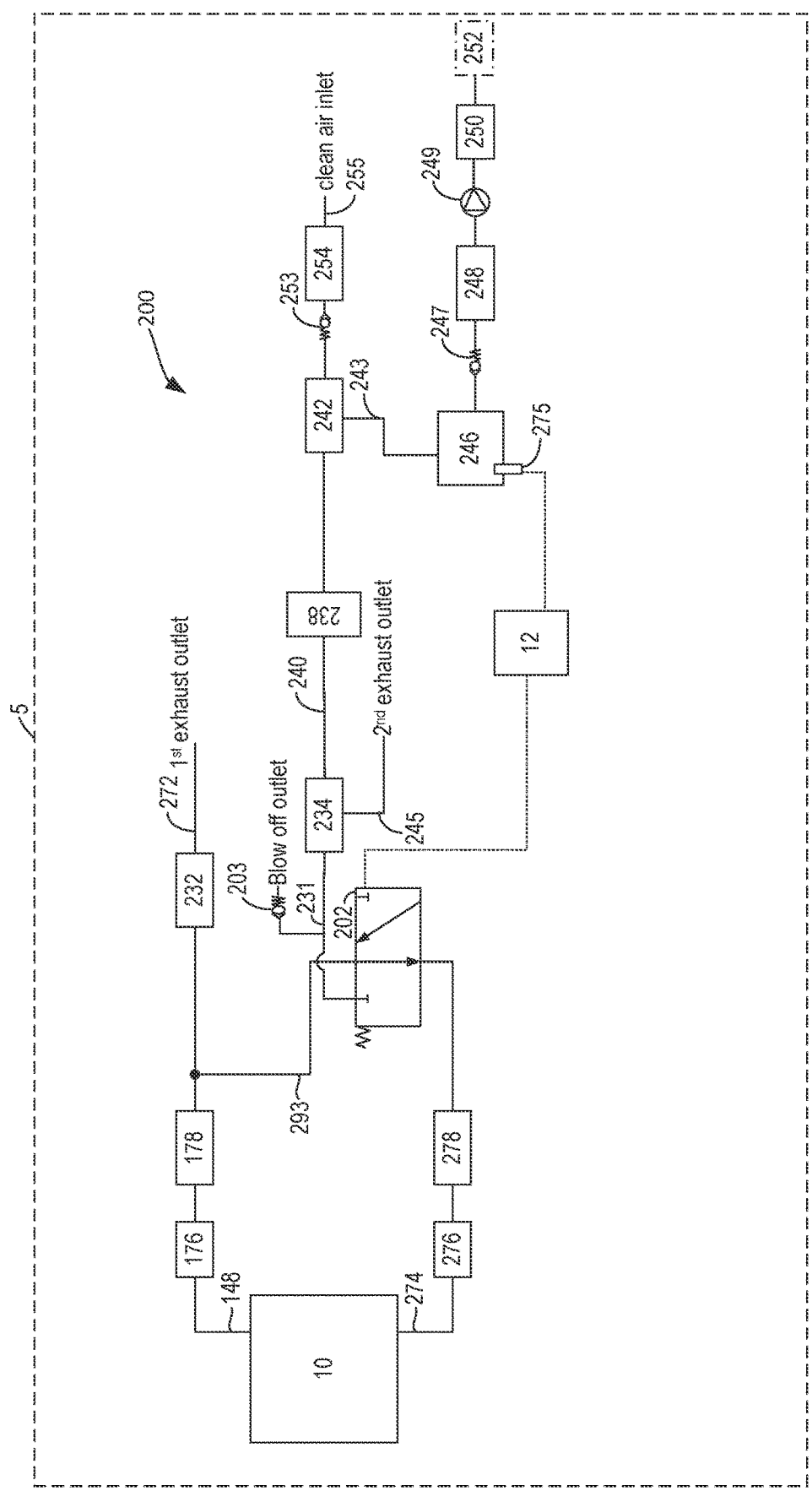
FIG. 2 shows an example exhaust powered air compression system.
Figure 4:
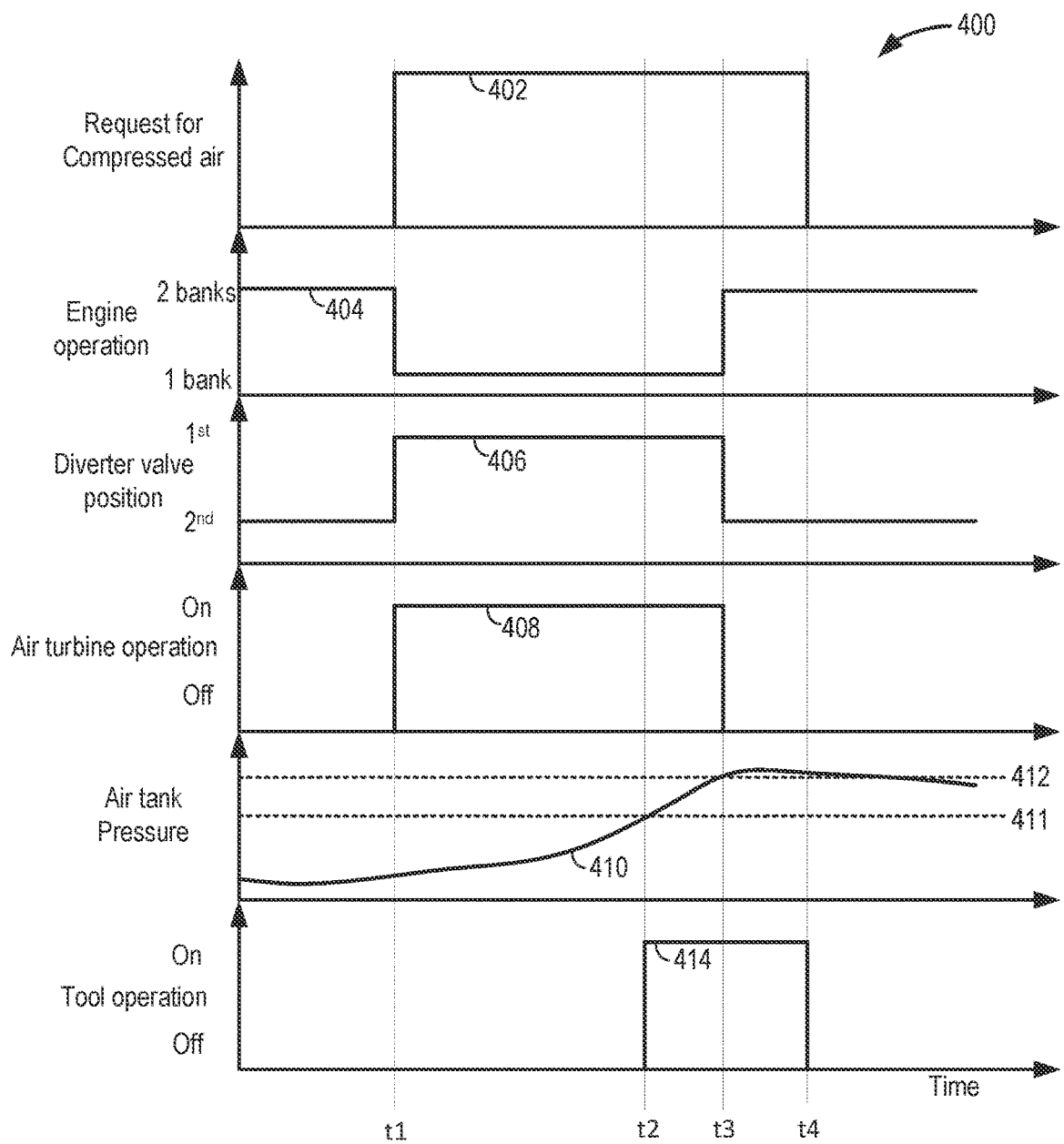
FIG. 4 shows an operating sequence for an exhaust powered air compression system.

The following description relates to systems and methods for generating compressed air for powering devices that consume compressed air. The compressed air may be generated from exhaust gases of an engine. In particular, the exhaust gases of the engine may be applied to operate an air compression system, including an air turbine and a compressor connected to the air turbine. The compressor may pressurize air and the pressurized air may be stored in a tank. The air compression system may be included in a vehicle, as shown in FIG. 1. The air compression system may be coupled to an exhaust system of an engine, as shown in FIG. 2. The air compression system may be operated according to a method for converting energy from engine exhaust into compressed air, as shown in FIG. 4. An example operation of the air compression system for compressed air generation is shown in FIG. 5.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via a driver demand pedal 132. In this example, driver demand pedal 132 includes a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56, 57 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

Engine 10 may be rotated via electric machine 52 during starting or when engine 10 is operated as an air pump. Alternatively, a starter motor (not shown) may rotate engine 10 during starting or when engine 10 is operated as an air pump. The starter motor may engage crankshaft 140 via a flywheel (not shown).

The powertrain may be configured in various manners, including as a parallel, a series, or a series-parallel hybrid vehicle. Further, engine 10 and electric machine 52 may be coupled via a gear set instead of a clutch in some configurations. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine, and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor 163.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 may be a three-way catalyst or an oxidation catalyst. Exhaust manifold 148, emissions control device 178, exhaust gas sensor 126, and temperature sensors may be included in engine exhaust system 11.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated, so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 22:1, depending on whether engine 10 is configured as a gasoline or diesel engine. The compression ratio may also be increased if direct injection is used due to its effect on engine knock.

Each cylinder of engine 10 may include a spark plug 192 for initiating combustion when the engine is configured to combust gasoline or petrol. However, spark plug 192 may be omitted when engine 10 is configured to combust diesel fuel. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition or compression ignition), one or multiple injections of fuel may be performed per cycle via either or both injectors. The multiple direct injection (DI) injections may be performed during the compression stroke, intake stroke, or any appropriate combination thereof in what is referred to as split fuel injection.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; a catalyst inlet temperature from a temperature sensor 158 coupled to exhaust passage 135; a catalyst temperature from temperature sensor 159; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations via sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders. In addition, controller 12 may receive input from and provide data to human/machine interface 115. In one example, human/machine interface 115 may be a touch screen device, a display and keyboard, a phone, or other known device.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more entire engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 2, a detailed view of an air compression system 200 for a vehicle 5 is shown. Devices and mechanical connections (e.g., conduits or passages) are shown as solid lines, and electrical connections are shown as dotted lines. In this example, engine 10 is configured with two cylinder banks (e.g., a V6 or a V8).

First exhaust manifold 148 may deliver exhaust gases from a first bank of cylinders in engine 10 to first turbine 176 and first catalyst 178. Similarly, second exhaust manifold 274 may deliver exhaust gases from a second bank of cylinders in engine 10 to second turbine 276 and second catalyst 278. In one example, the engine 10 may not be a boosted engine, and the exhaust gases from the first and second cylinder banks may directly flow to the respective catalysts. When compression system 200 is not activated, exhaust gases leaving catalyst 278 may pass through diverter valve 202 (when diverter valve 202 is in a first position) and flow through first exhaust passage 293. Diverter valve 202 prevents flow of exhaust gas to air turbine 234 when diverter valve 202 is in the first position. Exhaust gases flow through muffler 232 and exit to atmosphere via first, main exhaust exit passage 272.

Controller 12 may activate the air compression system 200 via starting engine 10, if engine is not already started, and may move diverter valve 202 to its second position. In the second position of the diverter valve 202, exhaust gas from the second exhaust manifold 274 may be routed to an air turbine 234 via a second exhaust passage 231. A blow off outlet may also be provided at the second exhaust passage 231 via check valve 203 so that exhaust pressure may be relieved, if desired.

The air turbine 234 may be connected to an air compressor 242 via a shaft 240. The exhaust gas flowing through the air turbine 234 may cause the turbine blades to rotate which in turn may cause the blades of the air compressor 242 to rotate. After flowing through the air turbine 234, the exhaust gas may be routed out to the atmosphere via a second exhaust exit passage 245. The second exhaust exit passage 245 may also include catalysts and a muffler.

A gear system 238 may be housed in the shaft 240. For a given turbine 234 and compressor 242 selection, adjusting the gear ratio of gear system 238 allows for optimization of air compressor 242 input shaft torque and speed. As an example, if the gear ratio is increased between the input and the output of the gear system, the air compressor 242 may accelerate faster due to higher input shaft 240 torque, and if the gear ratio is decreased, the highest speed of the air compressor 242 may increase if sufficient input shaft 240 torque is available. In one embodiment, the gear system 238 may be eliminated and the compressor 242 may be rotated at the same speed as the air turbine 234 via the shaft 240. As the air compressor 242 is rotated, ambient air may flow to the air compressor via a clean air passage 255. The clean air passage 255 may include an air filter 254 to remove particles from the incoming air stream, and a first check valve 253 to regulate the direction of air flow (such that air only flows towards the air compressor 242).

The pressurized air from the compressor 242 may be delivered to a tank 246 via an air line 243. The pressure in the tank 246 may be monitored via a pressure sensor 275 coupled to the tank 246. The compressed air may be stored at the tank or directly delivered to an air power consumer 252 of a tool 250 via a second check valve 247, a pressure regulator 248, and a tool trigger valve 249. The pressure regulator 248 ensures a transmission of compressed air to the air power consumer at a desired pressure. The second check valve 247 prevents back flow of air towards the tank 246. When the tool trigger valve 249 is in an open position, the compressed air from the tank 246 may flow to the tool 250 and when the tool trigger valve 249 is in a closed position, the compressed air may be stored in the tank 246. Flowing air through to the tool 250 via the tank may reduce pressure pulsations reaching the tool.

In response to a demand for compressed air, exhaust gas from the engine may be supplied to drive the air turbine 234 of the air compression system, and compressed air may be provided to one or more air consumers (tools) external to the engine. During the supply of the exhaust gas to the air turbine from the cylinders in the first cylinder bank of the engine, fueling and combustion may be suspended in the cylinders in the first cylinder bank and the diverter valve 202 may be actuated to a first position. The exhaust gas may be supplied to the air turbine in response to a pressure of compressed air stored in the tank 246 being lower than a first threshold pressure during a request for compressed air at the one or more air consumers. As the air is compressed at the air compressor 242 and stored in the tank 246, in response to the pressure of compressed air stored in the tank 246 increasing to the first threshold, the compressed air may be routed from the tank to the one or more air consumers, while continuing to route compressed air to the tank. Routing of the compressed air from the air compressor 242 to the tank 246 may be continued until the pressure in the tank increases to a second threshold pressure, the second threshold pressure higher than the first threshold pressure. In response to the pressure of compressed air stored in the tank 246 increasing to the second threshold, the diverter valve 202 may be actuated to a second position to suspend flow of the exhaust gas from the cylinders in the first cylinder bank to the air turbine 234.

In this way, the components described in FIGS. 1-2 enable a system for a vehicle, comprising: an engine including a first cylinder bank and a second cylinder bank, a first exhaust passage of the first cylinder bank configured to supply exhaust gas to an air turbine via a diverter valve, an air compressor coupled to the air turbine via a shaft, and an air tank configured to receive and store compressed air from the air compressor. A controller may include executable instructions stored in non-transitory memory to actuate the diverter valve to a first position to fluidically connect the first exhaust passage to the air turbine in response to a demand for compressed air at an external tool.

Figure 3A:
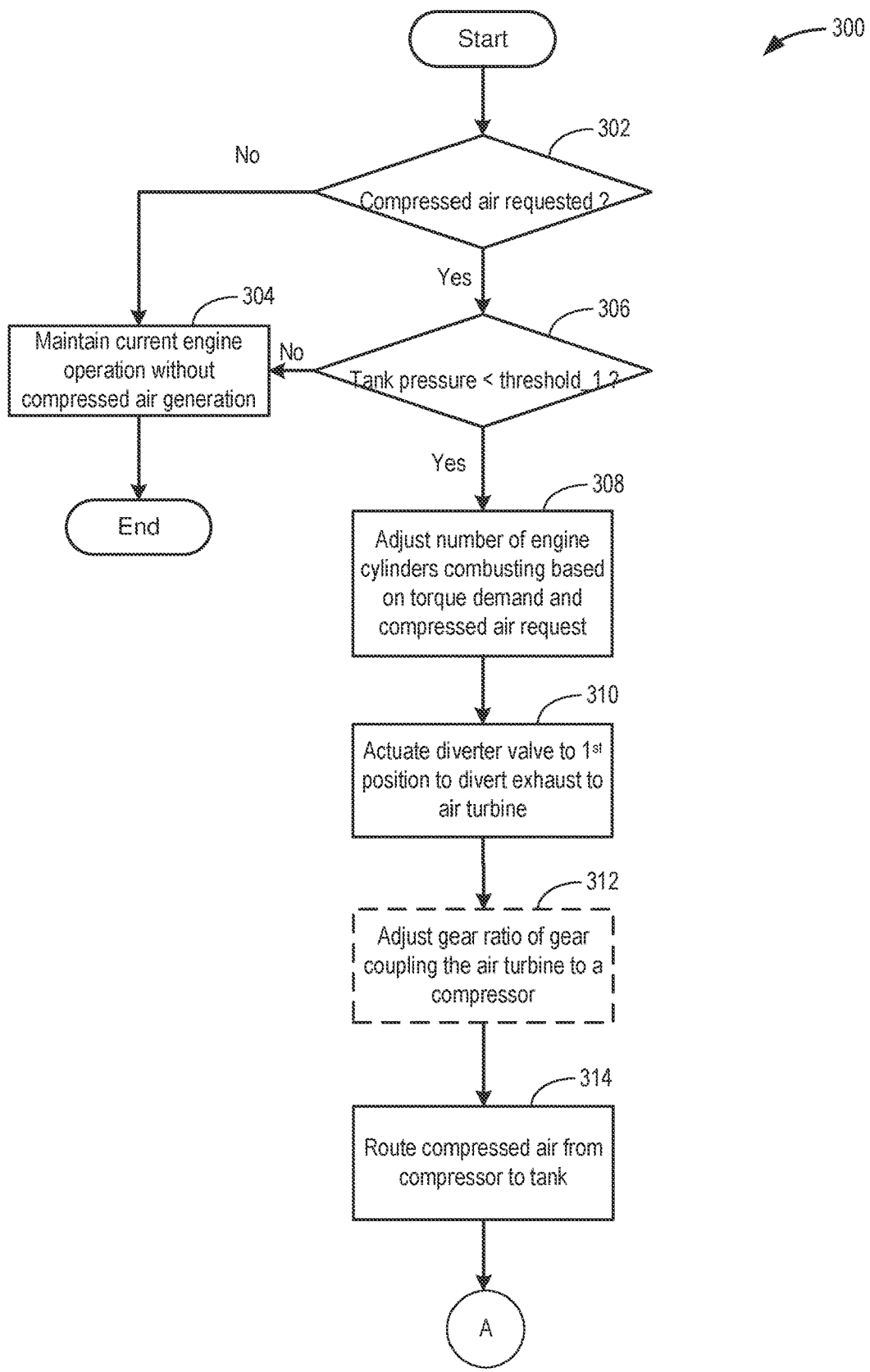
FIGS. 3A and 3B show a flowchart of an example method for operating an exhaust powered air compression system.
Figure 3B:
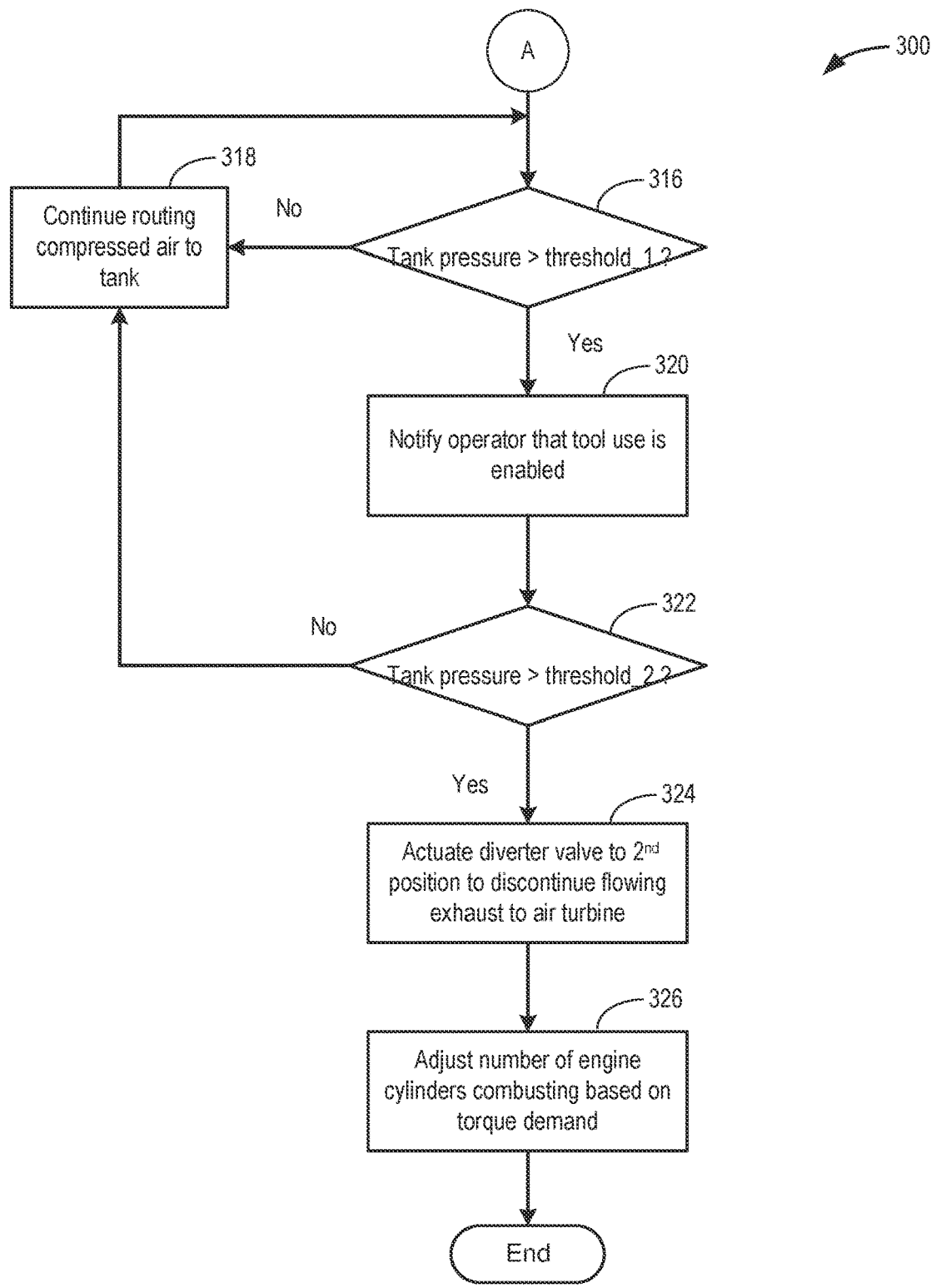

Referring now to FIGS. 3A and 3B, a method 300 for generating compressed air via exhaust gas energy from a vehicle is shown. Instructions for carrying out method 300 and other methods included herein may be executed by a controller (e.g. controller 12 of FIG. 2) based on instructions stored in a non-transitory memory of the controller and in conjunction with signals received from sensors of the engine system, such as the sensors described above with reference to FIGS. 1-2. The controller may employ engine actuators of the engine system to adjust engine operation, according to the methods described below. Method 300 will be described with regards to the systems described herein and depicted in FIGS. 1-2, but it should be understood that similar methods may be applied to other systems without departing from the scope of this disclosure. At 302, method 300 determines if compressed air is requested from the vehicle.

Compressed air may be requested by the operator via a human/machine interface (such as human/machine interface 115 of FIG. 1, which may be included in the vehicle dashboard or via a mobile device communicatively connected to the vehicle). The compressed air may be desired for operating a tool or inflating tires of the vehicle. If it is determined that a request for compressed air supply is not being made, at 304, current engine operation may be continued without generation of compressed air. For an engine with two cylinder banks, combustion of air and fuel may be carried out in one or both cylinder banks based on engine operating parameters, such as engine load and engine temperature. An air compression system (such as air compression system 200 in FIG. 2) including an air turbine (such as air turbine 234 in FIG. 2) and the corresponding air compressor (such as air compressor 242 in FIG. 2) may be maintained inactive.

If it is determined that a request for compressed air supply is being made, at 306, the routine includes determining if an air pressure in an air tank (such as tank 246 in FIG. 2) is lower than a first threshold pressure (threshold_1). The first threshold pressure may be pre-calibrated as the air pressure needed to operate a tool (such as tool 252 of FIG. 2). In one example, even if compressed air is not requested, the controller may periodically check if the pressure in the air tank is lower than the first threshold pressure.

If it is determined that the pressure in the air tank is higher than the first threshold pressure, it may be inferred that there is sufficient compressed air available in the tank to meet the requested compressed air demand, and generation of compressed air may not be initiated at this time. The routine may proceed to step 304 to maintain current engine operation without compressed air generation. The controller may actuate a tool trigger valve (such as valve 249 in FIG. 2) housed in a line connecting the air tank to the tool to an open position to allow flow of compressed air to the tool based on demand.

If it is determined that the pressure in the air tank is lower than the first threshold pressure, it may be inferred that further generation of compressed may be desired for operation of the tool. At 308, a number of engine cylinders combusting air and fuel may be adjusted based on engine torque demand and the compressed air request. In one example, for an engine including two cylinder banks (such as engine 10 in FIG. 2), a first cylinder bank may supply exhaust to the air compression system. Combustion may be suspended in the cylinders of the first cylinder bank, while combustion may be continued in the cylinders of the other, second cylinder bank to generate engine torque. By suspending fueling and combustion in the cylinders supplying exhaust to the air compression system, it may be ensured that clean air is routed to the air turbine which (due to lack of exhaust particles) may improve efficiency and reduce wear in the air turbine. In another example, during higher than threshold torque demand, combustion may be carried out in all engine cylinders, and exhaust from the first cylinder bank may be routed to the air compression system.

At 310, a diverter valve (such as diverter valve 202 in FIG. 2) may be actuated to a first position to divert exhaust from the first cylinder bank to the air turbine of the air compression system. In the default, second position of the diverter valve, the exhaust from the second cylinder bank may be routed to an exhaust exit passage (such as passage 272 in FIG. 2) via catalysts and mufflers without flowing to the air turbine. As the exhaust flows through the air turbine, the turbine may rotate. After flowing through the turbine, the exhaust may be routed to the atmosphere via another exhaust exit passage (such as passage 245 in FIG. 2). In this way, air being routed from each cylinder of the first cylinder bank to the air turbine may, by actuating a diverter valve to a first position, fluidically connect an exhaust manifold of the first cylinder bank to the air turbine.

At 312, a gear ratio of a gear system coupling the air turbine to an air compressor via a shaft may be optionally adjusted to regulate air compressor speed. The air compressor speed may be increased in response to an increase in compressed air demand, while the air compressor speed may be decreased in response to the tank reaching it capacity for holding the compressed air. In one example, the gear system may be eliminated, and the air compressor may rotate at the same speed as the air turbine. In another example, the gear system may be a fixed ratio.

At 314, compressed air from the compressor may be routed to the tank. The compressor may draw in ambient air via a clean air passage (such as clean air passage 255 of FIG. 2) and a check valve (such as first check valve 253 of FIG. 2) and compress the air. The air may be stored at the tank or delivered to the tool via the tool trigger valve. As the air is stored in the tank, a pressure in the tank may increase and the change in pressure may be monitored via a pressure sensor (such as pressure sensor 275 in FIG. 2) coupled to the tank.

At 316, the routine includes determining if the pressure in the tank has increased to the first threshold pressure. If the pressure increases to above the first threshold pressure, it may be inferred that sufficient air is present in the tank for tool operation. If it is determined that the pressure in the tank has increased to the first threshold pressure, at 320, the operator may be notified that toll usage is enables. The compressed air in the tank may be sufficient to operate the tool or inflate tires, as requested. In one example, steps 316 and 320 may be eliminated and compressed air may be routed directly from the compressor to the tool as the compressed air is being generated at the compressor.

If it is determined that the pressure in the tank has not increased to the first threshold pressure, at 318, compressed air may be continued to be routed to the tank. At 322, the routine includes determining if the pressure in the tank has increased to a second threshold pressure (threshold_2). The second threshold pressure may be pre-calibrated based on the capacity of the tank. An air pressure above the second threshold pressure may cause wear in the tank and increase the possibility of leaks.

If it is determined that the tank pressure is lower than the second threshold pressure, the routine may return to step 318 to continue routing compressed air to the tank. The air compression system may be continued to be operated. If it is determined that the tank pressure has reached the second threshold pressure, it may be inferred that further generation of compressed air may not be desired. Therefore, at 324, the diverter valve may be actuated to the second position to discontinue flowing exhaust from the first cylinder bank to the air turbine. In absence of the exhaust flow, the air turbine and the compressor may stop rotating and generation of compressed air may be suspended. In this way, the air pressure in the air tank may be monitored via a pressure sensor coupled to the air tank, and in response to the air pressure increasing to above a second threshold pressure, the diverter valve may be actuated to a second position to disconnect the exhaust manifold of the first cylinder bank from the air turbine. At 326, the number of engine cylinders combusting air and fuel may be adjusted solely based on engine torque demand. In one example, fueling may be resumed to all engine cylinders and exhaust from both cylinder banks may be routed to the atmosphere via a shared exhaust passage.

In this way, in response to a request for compressed air, fuel injection and combustion may be suspended in each cylinder of a first cylinder bank of the engine, air from the each cylinder of the first cylinder bank may be routed to an air turbine, and ambient air may be compressed via an air compressor coupled to the air turbine via a shaft. The request for compressed air may be made during an air pressure in the air tank being lower than a first threshold pressure while a request for operation of the tool is received from an operator.

FIG. 4 shows an example operating sequence 400 for an exhaust powered air compression system (such as air compression system 200 in FIG. 2) in a vehicle. The air compression system may include an air turbine coupled to an air compressor via a shaft. The compressed air may be used to operate a tool or inflate tires of the vehicle. The horizontal (x-axis) denotes time, and the vertical markers t0-t4 identify significant times in the compressed air generation operating sequence.

The first plot, line 402, denotes a request for compressed air. The request can be made by an operator via a HMI in the dashboard or a smart device connected to the vehicle indicating the desire to use compressed air to power a tool or pump the vehicle tires. The second plot, line 404, denotes engine operation. The engine includes two cylinder banks and, fueling and combustion can be carried out in one or both cylinder banks based on engine torque demand and air compression system operation. The third plot, line 406, denotes a position of a diverter valve (such as diverter valve 202 in FIG. 2) used to divert exhaust from one cylinder bank to the air compression system. In the first position of the diverter valve, exhaust from the first cylinder bank is routed to the air turbine while in the second position of the diverter valve, the exhaust from the second cylinder bank is directly routed to an exhaust exit passage without passing through the air turbine of the air compression system. The fourth plot, line 408, shows operation of the air turbine. The fifth plot, line 410, denotes a pressure of compressed air stored in a tank from where the air can be supplied to the tool as measured via a pressure sensor coupled to the tank. Dashed line 411 denotes a first threshold air pressure below which the tool cannot be effectively operated. Dashed line 412 denotes a second threshold air pressure above which compressed air cannot be stored in the tank. The sixth plot, line 414, denotes operation of the tool by the operator, the tool being powered by compressed air generated by the air compression system.

Prior to time t1, compressed air is not requested, and the engine is operated with fueling and combustion being carried out in both cylinder banks. Fuel is injected in one or more cylinders in each engine bank and combustion is carried out in those cylinders. The diverter valve is maintained in the second position and exhaust from the first cylinder bank is not routed to the air turbine, thereby causing the air turbine to be non-operational. The air pressure in the tank is below each of the first threshold and second threshold air pressure and the tool is not operated.

At time t1, a request for compressed air is received, and in response to the air pressure in the tank being lower than the first threshold, it is inferred that the tank does not contain sufficient air for operation of the tool, and compressed air generation is initiated. Fueling and combustion are suspended in the cylinders of the first cylinder bank. Even when combustion is suspended, air flows through the cylinders of the first bank. The diverter valve is actuated to the first position to route exhaust, which is essentially air, from the cylinders of the first bank to the air turbine. The air from the cylinders cause the air turbine to rotate, and consequently the air compressor to rotate. The rotation of the compressor draws in and compresses ambient air which is then directed to the tank. Between time t1 and t2, as the compressed air is generated and routed to the tank, the pressure in the tank increases. At time t2, in response to the pressure in the tank reaching the first threshold pressure 411, the operator is notified that operation of the tool can be initiated. Between time t2 and t3, compressed air generation is continued while the tool is being operated using compressed air form the tank.

At time t3, in response to the pressure in the tank reaching the second threshold pressure 412, generation of compressed air is suspended. The diverter valve is actuated to the second position to suspend routing of exhaust from the first engine cylinder bank to the air turbine, thereby stopping operation of the air turbine. Compressed air is no longer generated at the compressor. The engine operation is switched from combustion being carried out in a single bank to fueling and combustion being resumed in both cylinder banks. Between time t3 and t4, the tool is operated by using compressed air from the tank. At time t4, the tool operation is suspended and the compressed air is no longer routed to the tool.

In this way, exhaust from the engine may be effectively used for generating compressed air. By storing the compressed air in the tank, the air may be available for operation of tools and/or inflation of tires on demand. The technical effect of using energy from the exhaust to drive the air compression system is that parasitic loss of engine power is not increased, and engine torque may be continued to be fully utilized for operation of the vehicle. Overall, by including the ability to provide compressed air without towing a compressor or using an electric power source to drive a compressor, utility of a vehicle may be enhanced and customer satisfaction may be improved.

An example method for a vehicle comprises: supplying exhaust gas from an engine to drive an air turbine of an air compression system, and providing compressed air to one or more air consumers external to the engine. In any of the preceding examples, additionally or optionally, the air compression system includes the air turbine driven by exhaust gas and an air compressor driven by the air turbine, the air compressor drawing in ambient air via an air inlet and compressing the ambient air. In any or all of the preceding examples, additionally or optionally, the air turbine and the air compressor are coupled via a shaft, the shaft housing a gear system configured to adjust a speed of the air compressor relative to a speed of the air turbine. In any or all of the preceding examples, additionally or optionally, the exhaust gas is supplied to the air turbine in response to a pressure of compressed air stored in a tank being lower than a first threshold pressure during a request for compressed air at the one or more air consumers. Any or all of the preceding examples, additionally or optionally, further comprising, in response to the pressure of compressed air stored in the tank increasing to the first threshold, routing compressed air from the tank to the one or more air consumers while continuing to route compressed air to the tank. Any or all of the preceding examples, additionally or optionally, further comprising, routing the compressed air from the air compressor to the tank until the pressure in the tank increases to a second threshold pressure, the second threshold pressure higher than the first threshold pressure. In any or all of the preceding examples, additionally or optionally, the engine includes two cylinder banks and the exhaust gas is supplied to the air turbine from cylinders in a first cylinder bank via a diverter valve. Any or all of the preceding examples, additionally or optionally, further comprising, during the supply of the exhaust gas to the air turbine from the cylinders in the first cylinder bank, fueling and combustion is suspended in the cylinders in the first cylinder bank and the diverter valve is actuated to a first position. Any or all of the preceding examples, additionally or optionally, further comprising, in response to the pressure of compressed air stored in the tank increasing to the second threshold, actuating the diverter valve to a second position to suspend flow of the exhaust gas from the cylinders in the first cylinder bank to the air turbine.

Another example method for a vehicle, comprises: in response to a request for compressed air, suspending fuel injection and combustion in each cylinder of a first cylinder bank of the engine, routing air from each cylinder of the first cylinder bank to an air turbine, and compressing ambient air via an air compressor coupled to the air turbine via a shaft. In any of the preceding examples, additionally or optionally, the method further comprising, storing the compressed air in an air tank and/or directly supplying the compressed air to a tool coupled to the vehicle. In any or all of the preceding examples, additionally or optionally, the request for compressed air is made during an air pressure in the air tank being lower than a first threshold pressure while a request for operation of the tool is received from an operator. In any or all of the preceding examples, additionally or optionally, the routing of air from the each cylinder of the first cylinder bank to the air turbine includes actuating a diverter valve to a first position to fluidically connect an exhaust manifold of the first cylinder bank to the air turbine. In any or all of the preceding examples, additionally or optionally, the ambient air is drawn in to the air compressor via a clean air passage including a check valve, and wherein the compressed air is routed to the air tank via an air line. Any or all of the preceding examples, additionally or optionally, further comprising, monitoring the air pressure in the air tank via a pressure sensor coupled to the air tank, and in response to the air pressure increasing to above a second threshold pressure, actuating the diverter valve to a second position to disconnect the exhaust manifold of the first cylinder bank from the air turbine.

Yet another example system for a vehicle, comprises: an engine including a first cylinder bank and a second cylinder bank, a first exhaust passage of the first cylinder bank configured to supply exhaust gas to an air turbine via a diverter valve, an air compressor coupled to the air turbine via a shaft, and an air tank configured to receive and store compressed air from the air compressor. Any of the preceding examples, additionally or optionally, further comprising, an external tool coupled to the air tank via a tool trigger valve, the external tool operable using compressed air from the air tank. Any or all of the preceding examples, additionally or optionally, further comprising, a controller including executable instructions stored in non-transitory memory to: actuate the diverter valve to a first position to fluidically connect the first exhaust passage to the air turbine in response to a demand for compressed air at the external tool. In any or all of the preceding examples, additionally or optionally, the controller includes further instructions to: in absence of the demand for compressed air at the external tool, actuate the diverter valve to a second position to route exhaust gas from the first exhaust passage to an exhaust exit passage via one or more catalysts. Any or all of the preceding examples, additionally or optionally, further comprising, a gear system connecting the air turbine to the air compressor, and wherein the controller includes further instructions to: adjust a gear ratio of the gear system to adjust a speed a rotation of the air compressor relative to a speed of the air turbine, the air compressor configured to compress ambient air.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. Additionally, it should be appreciated that the valves described herein may be replaced with differently configured valves that provide similar functionality without departing from the scope of this disclosure.

It will be appreciated that the configurations and routines disclosed herein are exemplary in nature, and that these specific examples are not to be considered in a limiting sense, because numerous variations are possible. For example, the above technology can be applied to I-3, I-4, I-6, V-6, V-8, V-10, V-12, opposed 4, naturally aspirated, turbocharged, supercharged, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
    adjusting a number of engine cylinders combusting based on a torque demand and a compressed air request; and
    supplying exhaust gas from an engine to drive an air turbine of an air compression system, the air turbine coupled to a compressor via a gear system housed on a shaft, and providing compressed air to one or more air consumers external to the engine.

2. The method of claim 1, wherein the air compression system includes the air turbine driven by exhaust gas and an air compressor driven by the air turbine, the air compressor drawing in ambient air via an air inlet and compressing the ambient air.

3. The method of claim 2, wherein the air turbine and the air compressor are coupled via a shaft, the shaft housing a gear system configured to adjust a speed of the air compressor relative to a speed of the air turbine.

4. The method of claim 2, wherein the exhaust gas is supplied to the air turbine in response to a pressure of compressed air stored in a tank being lower than a first threshold pressure during a request for compressed air at the one or more air consumers.

5. The method of claim 4, further comprising, in response to the pressure of compressed air stored in the tank increasing to the first threshold, routing compressed air from the tank to the one or more air consumers while continuing to route compressed air to the tank.

6. The method of claim 4, further comprising, routing the compressed air from the air compressor to the tank until the pressure in the tank increases to a second threshold pressure, the second threshold pressure higher than the first threshold pressure.

7. The method of claim 6, wherein the engine includes two cylinder banks and the exhaust gas is supplied to the air turbine from cylinders in a first cylinder bank via a diverter valve.

8. The method of claim 7, further comprising, during the supply of the exhaust gas to the air turbine from the cylinders in the first cylinder bank, fueling and combustion is suspended in the cylinders in the first cylinder bank and the diverter valve is actuated to a first position, and wherein the exhaust gas is air compressed by the first cylinder bank.

9. The method of claim 8, further comprising, in response to the pressure of compressed air stored in the tank increasing to the second threshold, actuating the diverter valve to a second position to suspend flow of the exhaust gas from the cylinders in the first cylinder bank to the air turbine and adjusting engine fueling solely based on the torque demand.

10. A method for a vehicle, comprising:
    in response to a request for compressed air based on a tank pressure of an air tank,
    suspending fuel injection and combustion in each cylinder of a first cylinder bank of an engine;
    routing air from the each cylinder of the first cylinder bank to an air turbine; and
    compressing ambient air via an air compressor coupled to the air turbine via a gear system housed on a shaft.

11. The method of claim 10, further comprising, storing the compressed air in the air tank and/or directly supplying the compressed air to a tool coupled to the vehicle.

12. The method of claim 11, wherein the request for compressed air is made during an air pressure in the air tank being lower than a first threshold pressure while a request for operation of the tool is received from an operator, and wherein the suspending fuel injection and combustion is based on a torque demand and the tank pressure of the air tank.

13. The method of claim 12, wherein the routing of air from the each cylinder of the first cylinder bank to the air turbine includes actuating a diverter valve to a first position to fluidically connect an exhaust manifold of the first cylinder bank to the air turbine.

14. The method of claim 11, wherein the ambient air is drawn in to the air compressor via a clean air passage including a check valve, and wherein the compressed air is routed to the air tank via an air line.

15. The method of claim 13, further comprising, monitoring the air pressure in the air tank via a pressure sensor coupled to the air tank, and in response to the air pressure increasing to above a second threshold pressure, actuating the diverter valve to a second position to disconnect the exhaust manifold of the first cylinder bank from the air turbine.

16. A system for a vehicle, comprising:
    an engine including a first cylinder bank and a second cylinder bank;
    a first exhaust passage of the first cylinder bank configured to supply exhaust gas to an air turbine via a diverter valve;
    an air compressor coupled to the air turbine via a gear system housed on a shaft; and an air tank configured to receive and store compressed air from the air compressor.

17. The system of claim 16, further comprising an external tool coupled to the air tank via a tool trigger valve, the external tool operable using compressed air from the air tank.

18. The system of claim 17, further comprising a controller including executable instructions stored in non-transitory memory to: actuate the diverter valve to a first position to fluidically connect the first exhaust passage to the air turbine in response to a demand for compressed air at the external tool.

19. The system of claim 18, wherein the controller includes further instructions to: in absence of the demand for compressed air at the external tool, actuate the diverter valve to a second position to route exhaust gas from the first exhaust passage to an exhaust exit passage via one or more catalysts and suspend flow of exhaust gas to the air turbine.

20. The system of claim 18, wherein the controller includes further instructions to: adjust a gear ratio of the gear system to adjust a speed a rotation of the air compressor relative to a speed of the air turbine, the air compressor configured to compress ambient air.

* * * * *